(12) United States Patent
Adams et al.

(10) Patent No.: US 7,336,407 B1
(45) Date of Patent: Feb. 26, 2008

(54) SCANNER/POINTER APPARATUS HAVING SUPER-HEMISPHERICAL COVERAGE

(75) Inventors: Dennis J. Adams, Stow, OH (US);
Charles T. Knorr, Akron, OH (US);
Alan F. Lindsay, Massillon, OH (US)

(73) Assignee: Lockheed Martin Corporation, Akron, OH (US)

( * ) Notice: Subject to any disclaimer, the term of this patent is extended or adjusted under 35 U.S.C. 154(b) by 0 days.

(21) Appl. No.: 11/476,997

(22) Filed: Jun. 28, 2006

Related U.S. Application Data (63) Continuation of application No. 11/193,764, filed on Jul. 28, 2005, now abandoned.

(51) Int. Cl.
*G02B 26/08* (2006.01)

(52) U.S. Cl. .................................................. 359/211

(58) Field of Classification Search ................ 359/209, 359/211, 402, 837
See application file for complete search history.

(56) References Cited

U.S. PATENT DOCUMENTS

| | | | |
|---|---|---|---|
| 4,027,540 A | 6/1977 | Allard | 74/5.1 |
| 4,393,597 A | 7/1983 | Picard et al. | 33/275 |
| 4,515,447 A * | 5/1985 | Weimer et al. | 359/211 |
| 4,698,498 A * | 10/1987 | Mahoney et al. | 359/211 |
| 5,088,818 A | 2/1992 | Nicholson | 356/152 |
| 5,203,220 A | 4/1993 | Lerman | 74/5.22 |
| 5,391,165 A | 2/1995 | Fountain et al. | 606/4 |
| 5,902,996 A * | 5/1999 | Sauter | 359/405 |
| 6,343,767 B1 | 2/2002 | Sparrold et al. | 244/3.16 |
| 6,344,937 B1 | 2/2002 | Sparrold et al. | 359/837 |
| 6,396,235 B1 | 5/2002 | Ellington et al. | 318/649 |
| 6,549,700 B1 | 4/2003 | Sweatt et al. | 385/25 |
| 6,636,664 B2 | 10/2003 | Snyder et al. | 385/36 |
| 6,674,520 B1 | 1/2004 | Hicks et al. | 356/139.04 |
| 2004/0036934 A1 | 2/2004 | Dube et al. | 359/196 |
| 2004/0057656 A1 | 3/2004 | Chu et al. | 385/17 |

\* cited by examiner

*Primary Examiner*—Euncha P. Cherry
(74) *Attorney, Agent, or Firm*—Renner Kenner Greive Bobak Taylor & Weber (57) ABSTRACT

A scanner apparatus which has super-hemispherical coverage includes a receiver, a pair of counter-rotating prisms, and a rotating mirror aligned with the pair of counter-rotating prisms. The rotating mirror and the pair of counter-rotating prisms guide an observed optical signal in a field of regard greater than that which is achievable through the use of only the pair of counter-rotating prisms. The apparatus may also include a laser that generates an optical signal guided by the prisms and the mirror toward an object of interest in the field of regard.

26 Claims, 7 Drawing Sheets

FIG-7

SCANNER/POINTER APPARATUS HAVING SUPER-HEMISPHERICAL COVERAGE

CROSS REFERENCE TO RELATED APPLICATION

This application is a continuation of application Ser. No. 11/193,764 filed Jul. 28, 2005 now abandoned, which is hereby incorporated by reference.

TECHNICAL FIELD

The present invention resides in the art of scanner and pointer assemblies used to observe areas of interest. Specifically, the present invention is directed to an optical beam steering device used as a scanner and/or pointer that has an enlarged "field of regard." In particular, the present invention relates to an optical scanner and/or pointing device with counter-rotating prisms and a rotating azimuth mirror that are coaxially aligned.

BACKGROUND ART

To protect and defend military platforms, such as ships, aircraft, and ground-based installations, it is known to provide countermeasure systems that detect incoming threats such as enemy aircraft or missiles. Known systems detect incoming threats, such as infrared missiles, and then deploy defensive countermeasures in an attempt to destroy or divert the threat. These systems are referred to as open-loop systems since no immediate determination as to the type of threat or effectiveness of the countermeasure is readily available. Due to the inefficiency of the open-loop systems, closed-loop systems have been developed.

There are known performance benefits to using a directional, laser-based, closed-loop infrared countermeasure system to defeat infrared missiles. In a closed-loop system, the incoming missile is identified and the countermeasure system generates or tunes a jam code according to the specific incoming missile. The optimized jam code is directed at the missile which executes a maximum turn-away from its intended target. An additional feature of closed-loop techniques is the ability to monitor the classification and identification process during the jamming sequence. This provides a direct observation of the countermeasure effectiveness as well as an indication of the necessary corrective action required for the jam code. It will be appreciated that the benefits of the closed-loop performance system must be balanced against the cost of upgrading existing infrared directional countermeasure systems with a closed-loop capability, or against the cost of developing an entirely new closed-loop system.

One possible configuration for introducing a closed-loop receiver into a directional countermeasure system is to use a high resolution tracking sensor side-by-side with an infrared detector assembly. Accordingly, an independent receive channel, which is a separate optical path, must be added to the detection system with a separate expensive cooled detector. The cost and size impact of such a configuration to the countermeasure system is prohibitive.

Although effective, the above device has limited coverage area. In particular, it is believed that the maximum field of regard for such a device and other known prior art devices is 120°. These devices are constrained by the internal optical components and their mechanical movement. Additionally, these prior art systems require the use of slip rings for connection between the rotating and fixed components. As will be appreciated by those skilled in the art, slip rings introduce noise and they may wear over a period of time resulting in unreliable signals and improper guiding of the optical signals.

In some prior art systems only a 180° pivotable movement of the pointer was needed to obtain a 120° field of regard. However, such devices provide inadequate scanning coverage in the nadir area of interest. In other words, the area immediately above or below the scanning device is not easily observed. Obtaining continuous coverage whenever a detected object passes through nadir adds complexity to the mechanical and optical components. These complex solutions have proven to be quite costly and yet no device has been found that rapidly scans and accurately points an optical transmit/receive beam over more than $2\pi$ steradians using a single compact, lightweight, low-cost, beam-steering device. Therefore, there is a need in the art for a scanner/pointer device with improved coverage and which has simplified mechanical interconnections.

DISCLOSURE OF THE INVENTION

In light of the foregoing, it is a first aspect of the present invention to provide a scanner/pointer apparatus having super-hemispherical coverage.

The foregoing and other aspects of the present invention, which shall become apparent as the detailed description proceeds, are achieved by a scanner apparatus having super-hemispherical coverage, comprising a receiver, a pair of counter-rotating prisms, and a rotating mirror aligned with the pair of counter-rotating prisms, the rotating mirror and the pair of counter-rotating prisms guiding an observed optical signal to the receiver in a field of regard greater than that which is achievable through the use of only the pair of counter-rotating prisms.

Still other aspects of the present invention are achieved by a scanner apparatus, comprising a first prism rotatable in a first direction, a second prism aligned with the first prism and rotatable in a second direction, a mirror aligned with the first and second prisms and rotatable in one of the first and second directions, and a controller coupled to the prisms and the mirror to control positioning and at least observe an object of interest.

Yet other aspects of the present invention are achieved by a method for scanning a field of regard, comprising rotating a first prism in a first direction, rotating a second prism in a second direction, rotating a mirror in one of the first and second directions, and aligning the prisms and the mirror during the rotating steps to observe an object of interest in a field of regard.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
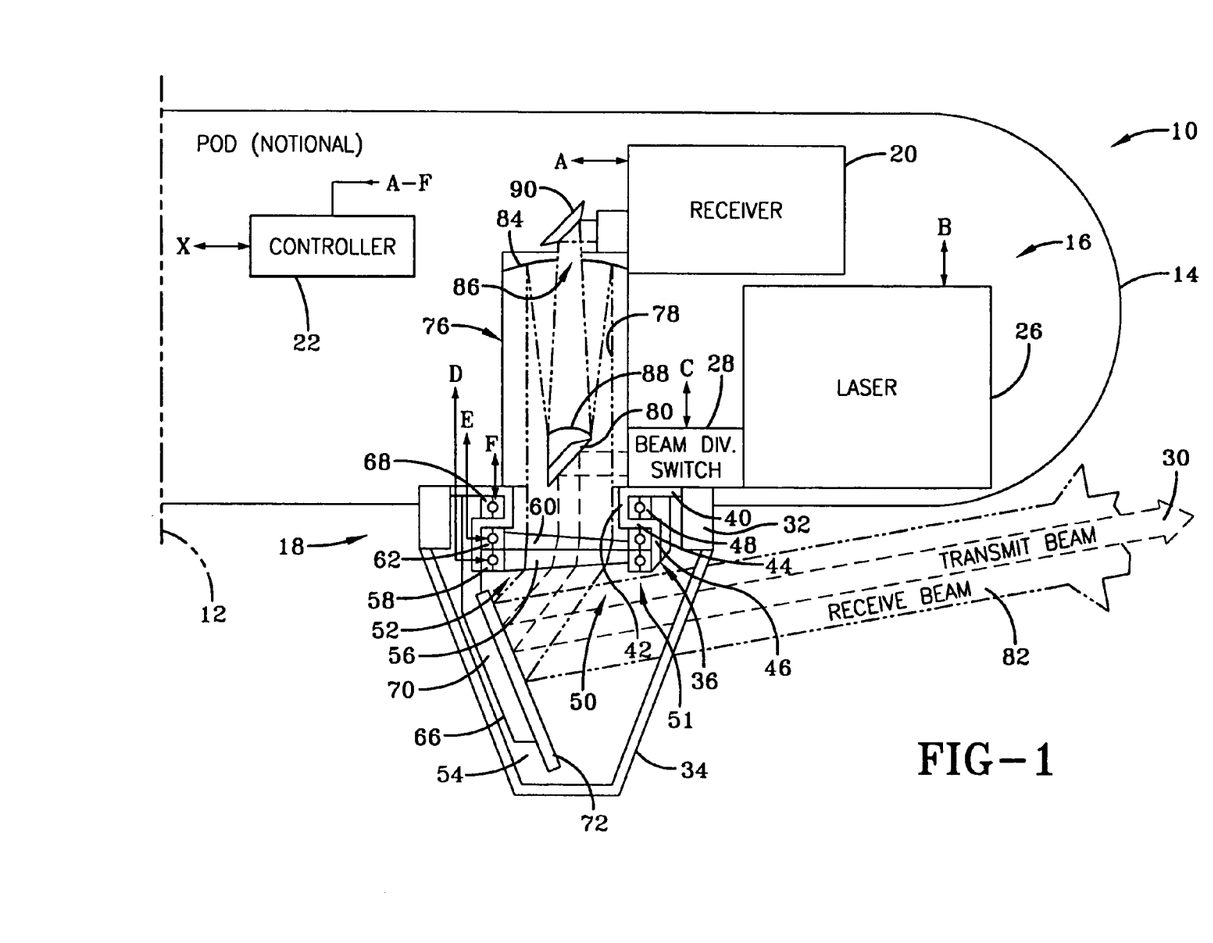
FIG. 1 is a schematic representation of a scanner/pointer apparatus made in accordance with the concepts of the present invention.

Referring now to the drawings, and in particular to FIG. 1, it can be seen that a scanner/pointer apparatus is designated generally by the numeral 10. It will be appreciated that the apparatus 10 may be incorporated into a platform 12 such as a plane, a ship, or a ground-based installation. The apparatus 10 is ideally employed to detect the presence of an in-bound infrared missile or other threat and determine the operating characteristics thereof. The apparatus then diverts the trajectory of the missile away from the platform. The apparatus 10 may also be employed to track any moving object by observing any time varying frequency components thereof. In other words, the apparatus 10 may be employed to observe any object in an area of interest. Although an infrared-based system is disclosed, it will be appreciated that the aspects of the present invention are applicable to other frequency-observable phenomena. The apparatus 10 is attached to the platform 12 and may be contained within a pod designated generally by the numeral 14.

The apparatus 10 includes a transmitter designated generally by the numeral 16 and which is coupled to a tracking system 18. Briefly, the tracking system 18 observes a field of regard or coverage area in a predetermined period of time such as once per second. In the event an object of interest, such as an infrared heat-seeking missile, is detected, then the tracking system 18 maintains observational contact with that object. The system 18 includes a receiver 20 that is connected to a controller 22. It will be appreciated that the controller 22 directly communicates with and controls the transmitter system 16 and the tracking system 18. In particular, the receiver 20 is connected to the controller 22 via a signal line designated as capital letter A. Other capital letter designations indicate a connection between the controller and other components of the apparatus 10. The controller 22 includes the necessary hardware, software and memory for implementing the functions of the apparatus 10. The controller 22 is likely connected to other components maintained by the platform as indicated by the capital letter X. These other components may include a command and control center or other on-board computer system which relays information regarding possible threats and to determine the effectiveness of countermeasures.

The transmitter 16 includes a laser 26 which generates a pulsed light beam. The laser 26 is connected to the controller 22 as evidenced by the signal line B. A beam divergence switch 28 is coupled to the laser 26 and is connected to the controller via signal line C. The beam divergence switch 28 allows the laser to operate in a scan mode or a jam mode. In the scan mode, the beam divergence switch allows for about a three degree conical beam to be generated. After a target is detected, the beam divergence switch, as instructed by the controller, converts the conical beam to about 0.1 degree conical beam in the jam mode. The switch 28 allows the apparatus to focus more energy on an incoming threat as determined by the controller so as to more easily divert the trajectory of the threat. In any event, the laser 26 generates a transmit beam designated generally by the numeral 30. Although the transmitter 16 is employed in the detection and monitoring of an observed object, it will be appreciated that use of the transmitter 16 is not required if the apparatus 10 is only used to observe an object of interest within the field of regard.

The tracking system 18 directs the transmit beam 30, or observes a received beam or area of interest as determined by the controller. The tracking system 18 includes a frame 32 carried by the pod 14. A dome 34 encloses the frame 32 and other components carried thereby. In particular, the dome 34 allows for the laser light and other infrared energy to pass through the dome without distortion, interference, or the like. The dome may be constructed of a silicon, germanium or any other material known in the art for the purpose of transmitting or passing through infrared signals.

A core 36 is secured to the frame 32 and carries the rotatable components of the tracking system 18. The core 36 includes a flange 40 that is secured to the frame 32 by fasteners or other mechanical fixtures. Extending axially from the flange 40, away from the pod 14, is a collar 42 from which radially extends a ledge 44. Further extending axially from an outer peripheral end of the ledge 44 is a rim 46 which has a diameter or periphery larger than the collar 42. The flange 40, the collar 42, and the ledge 44 collectively form a channel designated generally by the numeral 48 about the exterior of the core 36. The rim 46 forms an interior bore 50. The core 36 provides a core opening 51 extending therethrough. Rotatably carried within the bore 50 is a Risley prism combination 52. Externally mounted and rotatably received in the channel 48 is an azimuth mirror assembly 54. The Risley prism combination 52 and azimuth mirror assembly 54 are rotatable with respect to the core and are coaxially aligned with one another. As will be discussed in further detail, the prism combination and mirror assembly are independently rotatable with respect to one another so as to obtain super-hemispherical field of regard coverage by the tracking system.

The Risley prism combination 52 includes a prism 56 which is operatively rotated by a motor/encoder assembly 58. The assembly 58 is connected to the controller 22 via signal line D. The motor/encoder assembly 58 includes a rotatable encoder ring mounted on the prism 56. It will be appreciated that the prism 56 is a circular wedge-shaped prism that is rotatably received within the bore 50. The assembly 58 also includes an encoder readout that observes the position of the encoder ring and transmits this positional information to the controller 22 via signal line D. Also included in the assembly 58 is a motor which rotates the prism 56 wherein the amount and direction of positional rotation is controlled by the controller 22.

The Risley prism combination 52 also includes a second circular wedge-shaped prism 60 which has associated therewith a motor/encoder assembly 62 that is connected to the controller via a signal line E. The assembly 62 operates in much the same manner as the assembly 58 so as to independently monitor and control the rotatable movement of the prism 60 within the bore 50.

Figure 2:
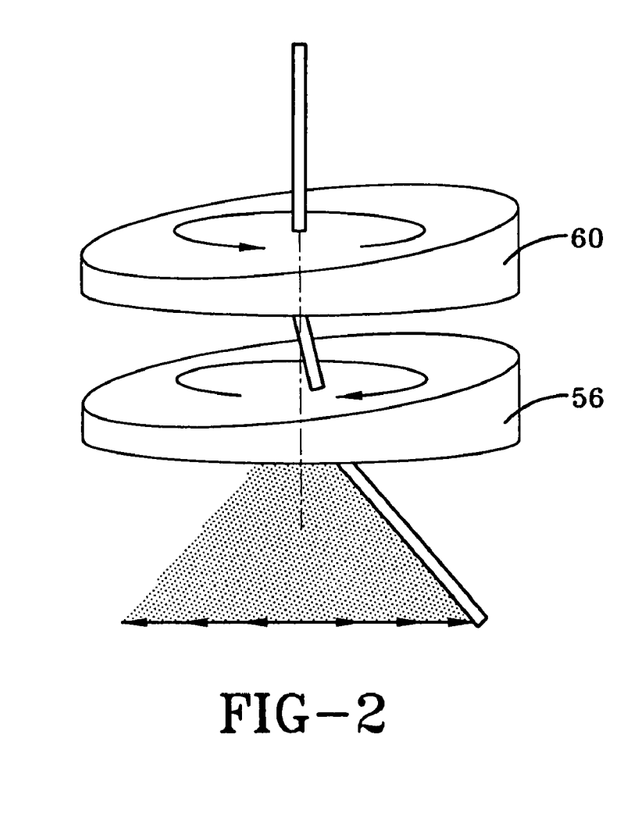
FIG. 2 is a schematic diagram of a Risley prism combination wherein each prism is counter-rotated at a same rate.
Figure 3:
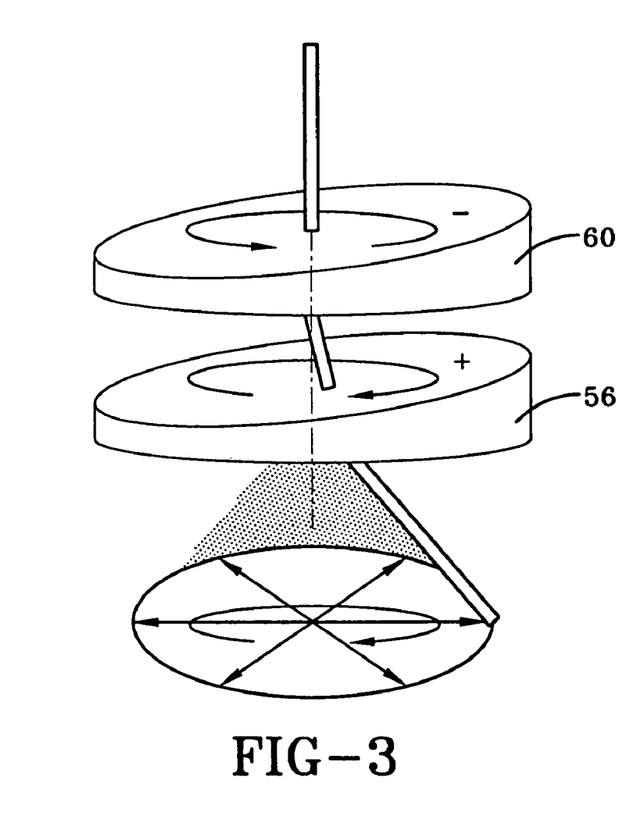
FIG. 3 is a schematic representation of the Risley prism combination wherein each prism is counter-rotated at a different rate.

Referring now to FIGS. 2 and 3 it can be seen that the two prisms 56 and 60 counter-rotating at the same speed steer a transmit/receive beam along a linear sweep. Accordingly, one back-and-forth "nod" cycle per prism rotation obtains a linear sweep. It will further be appreciated that the sweep rate for such a construction is sinusoidal with time. In other words, the device sweeps fastest through the prism rotation axis. However, as seen in FIG. 3, if the prism rotational rates differ, a linear sweep rotates about the prism rotation axis at the difference rate. Accordingly, the linearly-swept beam rotates to sweep out a conical volume. Risley prisms are normally used for visible light propagation, but such a construction provides only a limited deflection of the light. However, materials capable of transmitting infrared energy typically have higher indices of refraction than materials capable of transmitting visible light. Therefore, Risley prisms constructed of these infrared-transmissive materials can refract (or "bend") the infrared beam to a larger deflection angle, thereby obtaining a larger field of regard.

Figure 4:
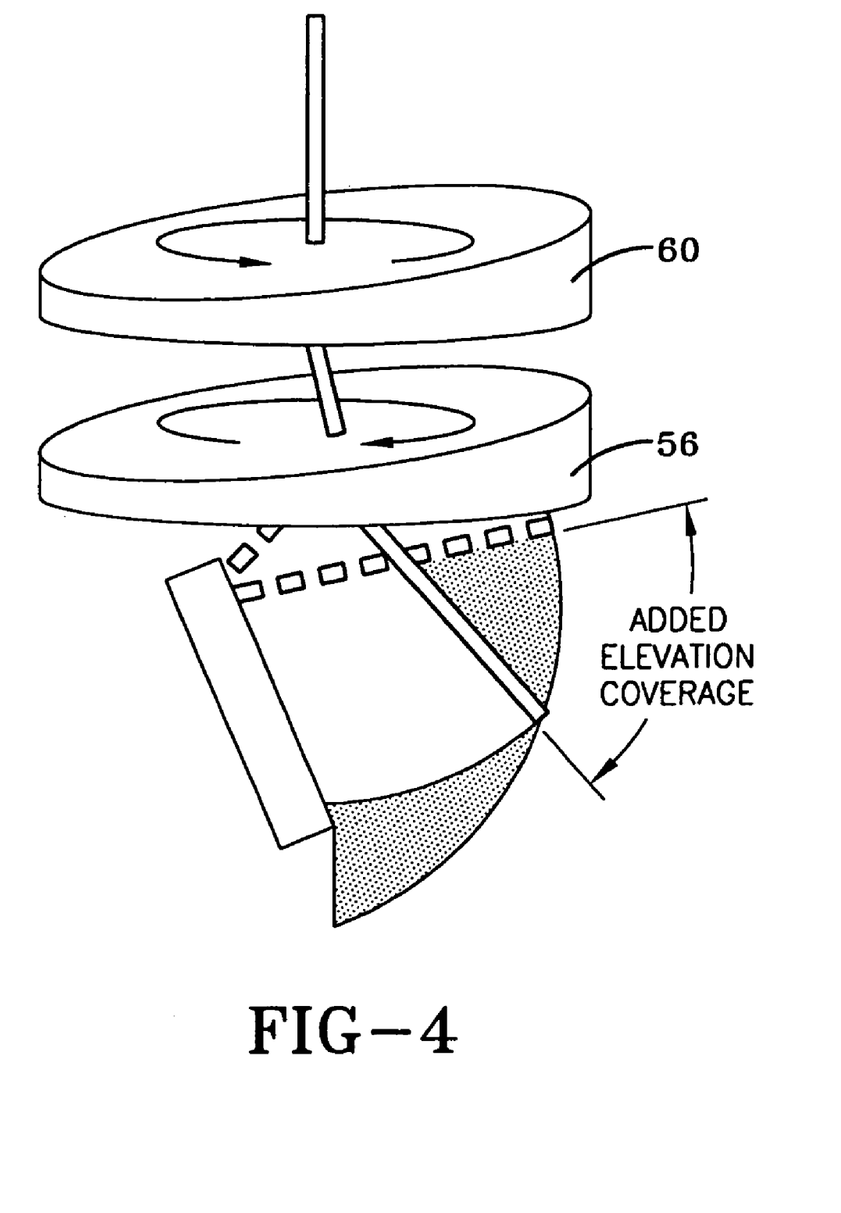
FIG. 4 is a schematic representation of the Risley prism combination coupled to an azimuth mirror.

The azimuth mirror assembly 54 includes a mirror carrier assembly 66 that is rotatably received in the channel 48. The assembly 66 is coupled to a motor/encoder assembly 68 and is connected to the controller 22 by a signal line F. The assembly 68 operates in much the same manner as the assemblies 58 and 62. Together, the assemblies 58, 62, and 68 allow their corresponding prisms and mirror to rotate independently within the core opening 51. As such, the rotational position of the mirror assembly 54 is coordinated with the rotational position of both prisms. The carrier assembly 66 includes a downwardly extending bracket 70 which carries an angularly oriented azimuth mirror 72. It will be appreciated that the mirror 72 is aligned such that about one-half of the core opening 51 is in juxtaposition thereto. In other words, the prisms are rotatable such that the transmit or receive beams pass directly through the dome 34 or, in the alternative, the beams may be directed against the mirror and then pass through the dome. As will be discussed in further detail, rotation of the azimuth mirror assembly correlates to the difference in rotation rates of the prisms in the Risley pair combination.

A column 76 is coaxially oriented with respect to the core 36 and in particular with the core opening 51. The column 76 provides an interior surface 78 which is coaxially aligned with the azimuth mirror assembly 54 and the prisms 56 and 60. The interior surface 78 contains a set of mirrors which assist in the passing through of the transmit and receive beams for receipt by the receiver 20. In particular, the column 76 internally carries a transmit mirror 80 which is angularly positioned to reflect the transmit beam 30 generated by the laser 26. In other words, the transmit mirror 80 is angled within the column such that as the laser beam impinges upon the transmit mirror 80, the transmit beam is directed through the prisms as previously discussed. When the transmit beam 30 is reflected by an object of interest or other object it is converted into a receive beam 82. The beam 82 may also be referred to as an observed optical signal. It will further be appreciated that the receive beam 82 may not be a reflected signal, but may simply be any observable phenomonena by the receiver 20. In any event, the receive beam 82 is collected into the column through the prisms either directly or by reflection upon the azimuth mirror 72. The receive beam 82 is then received within the volume defined by the interior surface 78 and is collected by an end mirror 84 disposed within the column 76 at an end opposite the Risley pair combination. The end mirror 84 is provided with a central aperture 86 therethrough. The receive beam 82 is reflected by the end mirror 84 and directed toward a focus mirror 88. The focus mirror 88 is positioned within the column interior 78 and is positioned at a backside of the transmit mirror 80. Accordingly, the receive beam is then directed by the end mirror to the focus mirror 88 which then re-directs the receive beam through the aperture 86 to a receiver mirror 90. The receiver mirror is disposed on a nonreflective side of the end mirror 84 and the receive beam is directed into the receiver 20. In the alternative, the receiver 20 may be oriented such that the beam 82 is directly received thereby without the need for the receiver mirror 90. In any event, the receiver 20 receives the receive beam and information related to the characteristics of the beam are transferred to the controller 22 for analysis.

Figure 5A:
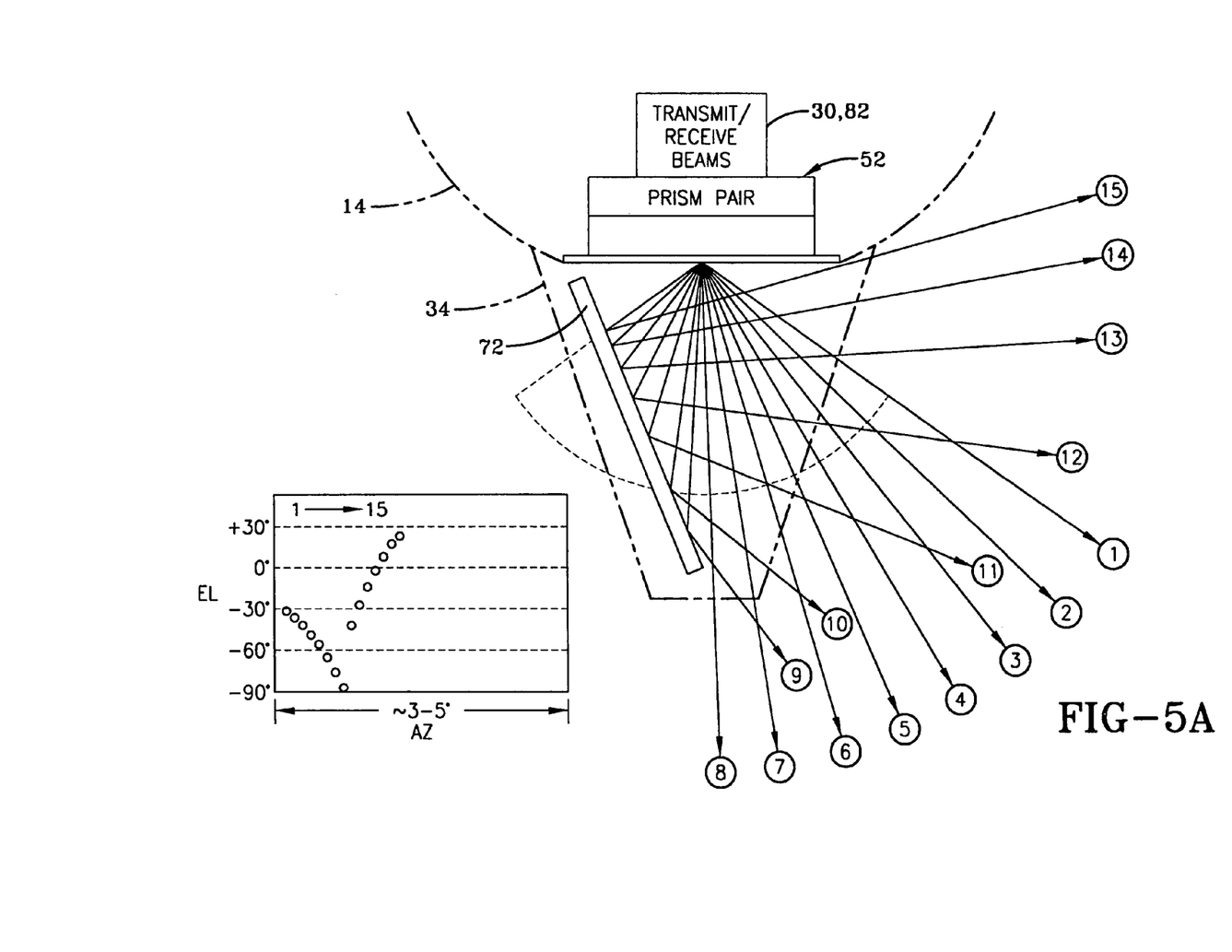
FIGS. 5A and B illustrate scanning performed by the apparatus in a first operational cycle in FIG. 5A and a second operational cycle in FIG. 5B.
Figure 5B:
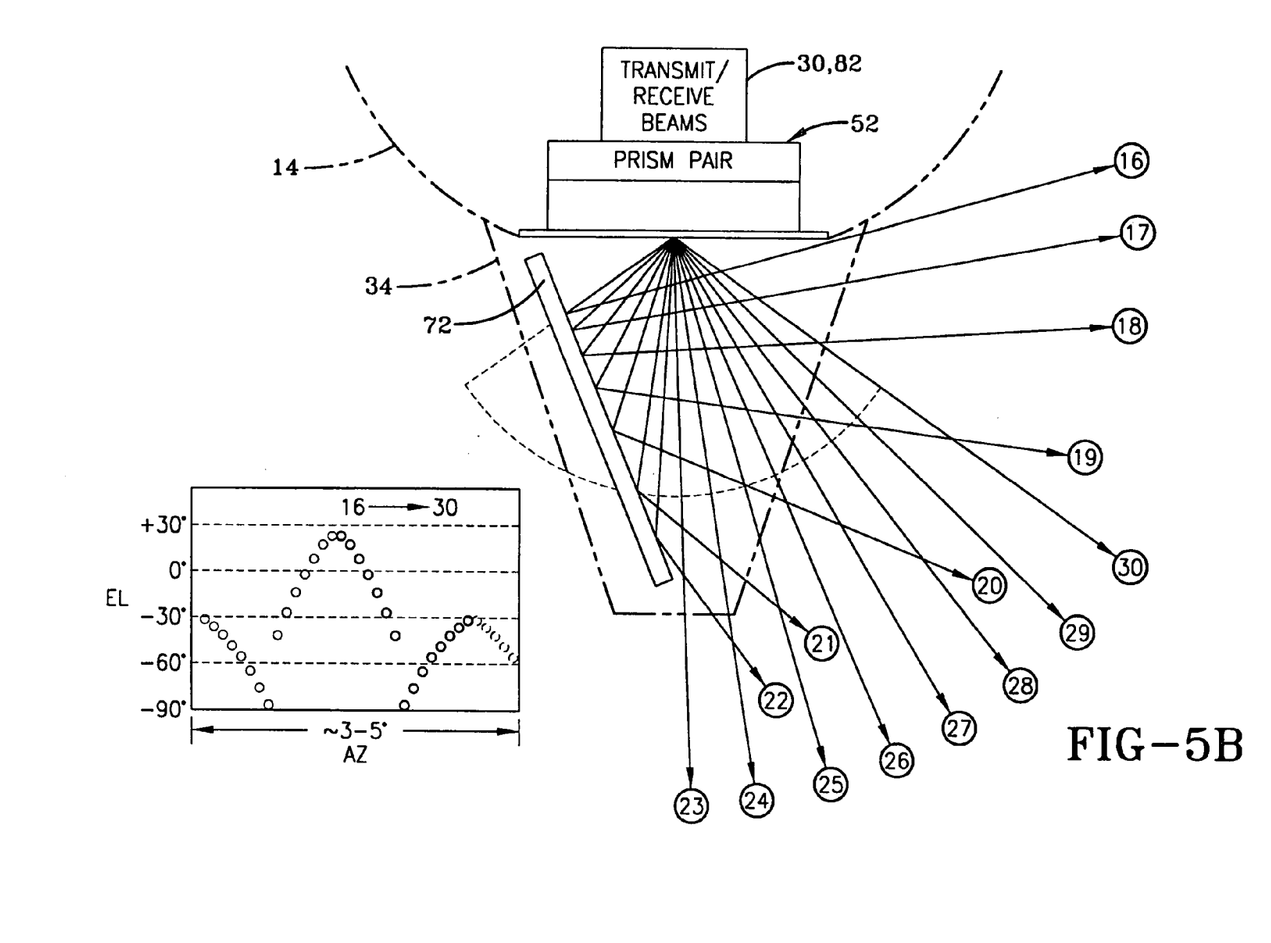
Figure 6:
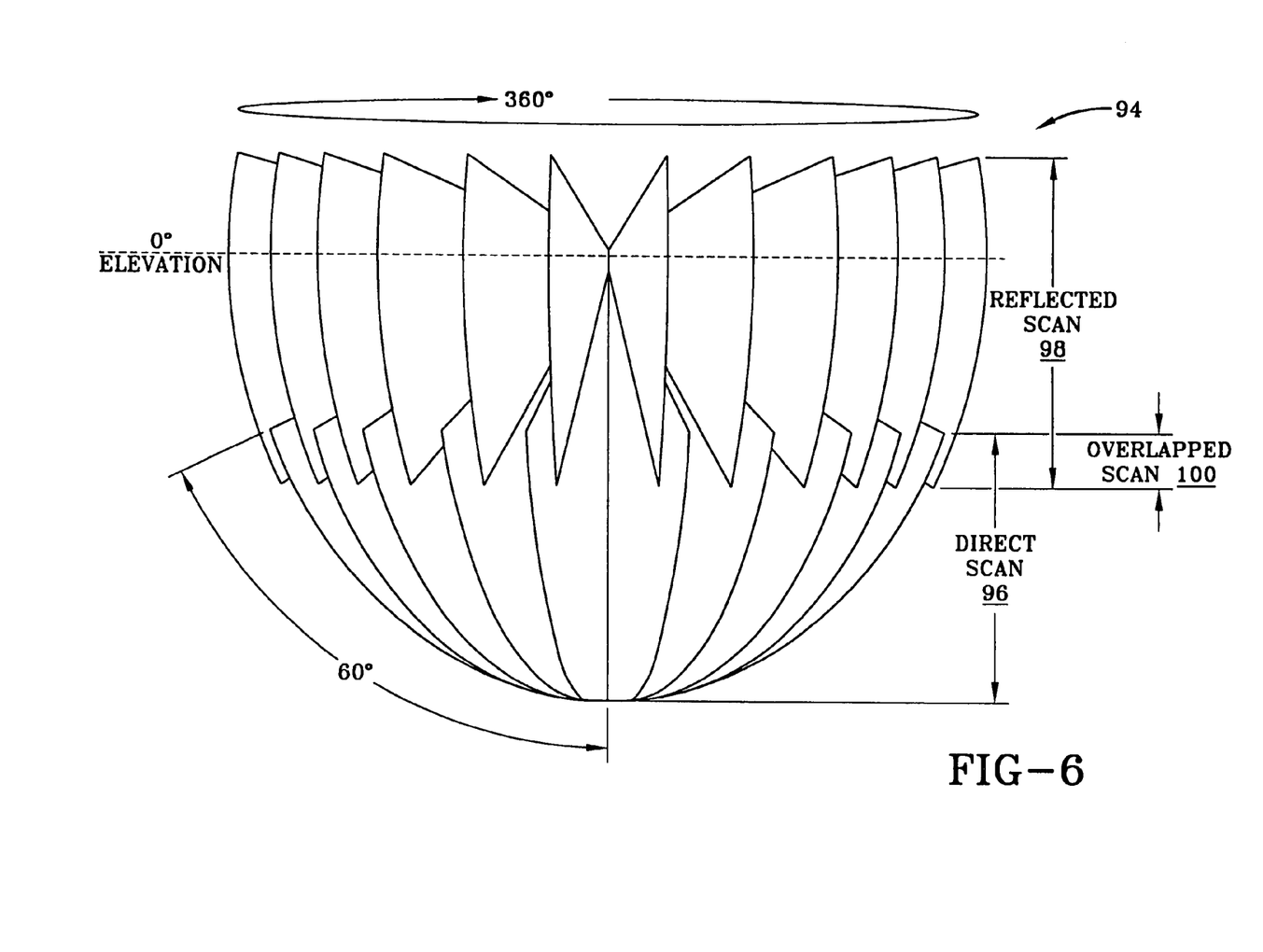
FIG. 6 is a schematic representation of the hemispherical coverage obtained by the scanner/pointer apparatus.

Referring now to FIGS. 5A, 5B and 6 it will be appreciated that a super-hemispherical coverage, designated generally by the numeral 94, may be obtained by counter rotation of the prisms 56 and 60 and rotation of the azimuth mirror 72. Such a super-hemispherical sweep or field of regard is obtained by counter-rotating the prisms at a different rate while simultaneously rotating the azimuth mirror assembly at the difference rate. For example, the prism 56 may rotate in a clockwise manner at about 100 revolutions per second while the prism 60 rotates in counter-clockwise manner at about 99 revolutions per second, thus producing a difference of about one revolution per second between the prisms. As shown in FIGS. 2-3, this causes the transmit and/or receive beams to sweep out a conical volume. The mirror 72 is simultaneously coaxially rotated in a clockwise direction at about one revolution per second (the difference rate) to obtain elevational coverage above that obtained in the normal conical coverage. It is believed that the most effective operation is when the mirror 72 rotates in the same direction as the faster of the two prisms, which in this example is the clockwise direction. If the above difference rate relationship is not substantially maintained, then the transmit and/or receive beams will not uniformly sweep the super-hemispherical area.

Referring to FIG. 5A, it can be seen that initially the transmit beam is directed outwardly at a −30° elevational angle, wherein the 0° elevational level is determined by the position of the prisms 56 and 60 (prism pair 52). In other words, beams that are observed below the prisms exhibit a negative elevational angle and beams that are observed by virtue of the mirror 72 may exhibit either a negative or a positive (above the prisms) elevational angle depending upon the angle obtained by the beam steering of the Risley prism combination. In any event, as the Risley prisms counter-rotate, the transmit beam is re-oriented from about a −30° elevational to about a −90° elevational angle to directly observe the field of regard. As the first half cycle proceeds, the transmit beam impinges upon the mirror 72 and shifts to about a −45° elevational angle. This angle is due to several factors, including the fixed elevation angle at which the mirror 72 is mounted. As the Risley prisms continue to counter-rotate the elevational angle gradually shifts to about +25° to reflectively observe the field of regard. Upon reaching this particular elevational angle, the transmit beam is interfered with by the platform or pod and the controller initiates a second half cycle (FIG. 5B) wherein the continued rotation of the prisms causes the reflected transmit beam or the observed receive beam to proceed from the +25° elevational angle to about a −45° elevational angle whereupon the beam no longer is impinged upon the mirror 72 and then the direct observation of the field of regard is completed from about a −90° elevation through about a −30° elevation. At this point, the first half cycle (FIG. 5A) repeats.

The representations of the half cycles are best seen in FIG. 6 where the super-hemispherical coverage 94 is comprised of a direct scan component 96 and a reflected scan component 98. As will be appreciated, there is an overlap scan component 100 between the −30° to approximately −45° elevation. When an observable object or other threat is detected in any of the regions, the controller is able to stop rotation of the motor/encoder assemblies such that the apparatus may stare or focus upon the object of interest. If an object is detected as an incoming missile, then the beam divergence switch 28 is activated so as to focus the transmit beam upon the object and divert its trajectory from the platform. As the trajectory of the object changes, it will be appreciated that the controller is able to move the rotatable components so as to maintain contact therewith as long as deemed necessary. In those instances where the detected object is within the overlap region 100, the controller 22 implements operational procedures so as to ensure that contact with the object is maintained.

Figure 7:
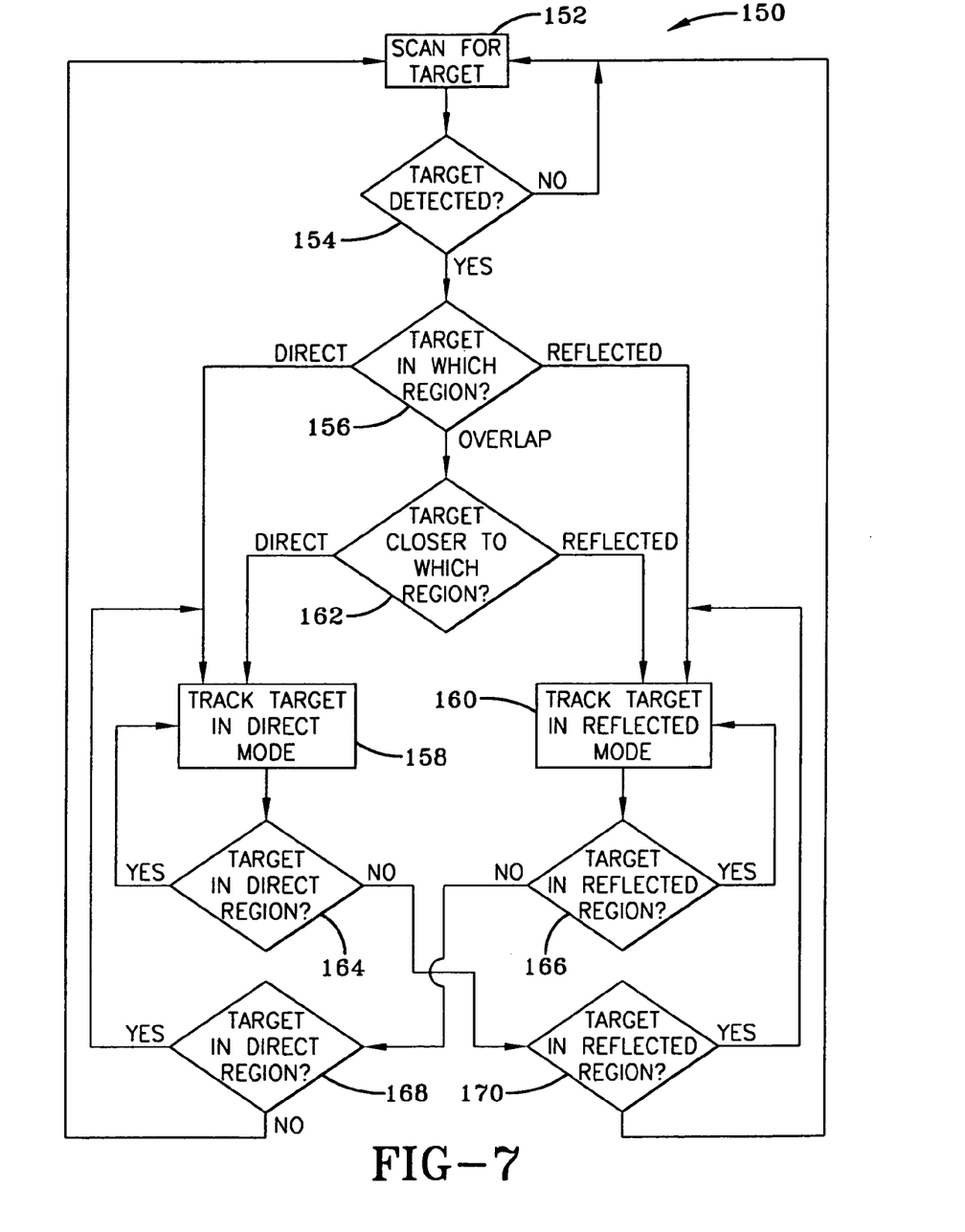
FIG. 7 is a flow chart showing operation of the scanner/pointer apparatus when a detected object is within an overlap region that is a combination of a direct scan region and a reflected scan region.

Referring now to FIG. 7 it can be seen that a methodology, indicated generally by the numeral 150, illustrates the processing of reflected and directly observed optical signals in the field of regard. In other words, if an object of interest is detected in the field of regard, the controller stops the normal counter-rotation of the prisms and rotation of the mirror so as to allow the laser to focus upon the object of interest. Accordingly, the controller determines whether the object of interest is in the direct scan region 96, the reflected scan region 98 or the overlap scan region 100. When the controller determines which region the object of interest is in, the controller instructs the respective motor/encoder assemblies to direct the transmit beam accordingly. If the object of interest moves from one of the regions to the other, the controller slews or rotates the prisms and/or mirror accordingly.

As best seen in the methodology 150, the controller scans for a target at step 152. If a target is not detected at step 154, the controller continues on with normal operation of the apparatus. In other words, the apparatus continues with counter-rotations of the prisms at the predetermined rates while the mirror rotates at the difference rate as previously described. If a target is detected at step 154, the controller determines in which region the target is located. If the object of interest or target is detected in the direct scan region, the process proceeds to step 158. If the object of interest is detected in the reflected scan region 98, then the process continues to step 160. And if the target is detected in the overlap region, then the process continues to step 162.

At step 158, the target is tracked in the direct mode or direct scan region 96. In other words, the controller relies just on the counter-rotating prisms to track the object of interest.

At step 160, the controller tracks the object of interest in the reflected mode or reflected scan region 98 by utilizing both the counter-rotating prisms and the rotating azimuth mirror.

At step 162, when the target is in the overlap region 100, the controller analyzes the location of the object of interest and determines whether the object of interest is closer to the reflected scan region 98 or the direct scan region 96. If the object of interest is closer or more predominately in the direct scan region 96, then the methodology or controller proceeds to perform step 158 as described above. In the alternative, if the controller determines that the object of interest is closer to the reflected scan region or it is closer or more effectively tracked in the reflected scan region, the process continues to step 160 and that step is performed as described above.

At step 164, the controller determines whether the object of interest remains in the direct scan region. If so, then the controller repeats step 158. This process is continually repeated until such time that the target is no longer found in the direct scan region. Likewise, at step 166, if the target is determined to be in the reflected scan region, the step 160 is continually repeated until such time that the target is no longer in the reflected region.

Once the target moves out of the reflected scan region, then the controller initiates step 168 to determine whether the target has moved to the direct scan region 96. If the target is found in the direct scan region, then the process returns to step 158 and that step executed again. However, if the target is no longer found in the direct scan region, then the process returns to step 152 and the controller re-initiates a scanning mode to cover the entire field of regard. Likewise, at step 170 the controller inquires as to whether the target is still detected in the reflected scan region. If the target is found in the reflected region, then the methodology returns to step 160 and that step is executed as described above. If, however, the target is no longer found in the reflected scan region, the process return to step 152 and the controller initiates an entire scanning of the field of regard. It will be appreciated that at any time during this process that the controller may energize the beam divergence switch 28 so as to focus the laser beam on the target for the purpose of diverting its trajectory. It will further be appreciated that the controller may utilize historical analysis in determining when an object of interest is likely to move from a direct scan region to a reflected scan region or vice versa. In other words, based on past observations of detected targets the controller may easily anticipate when an object of interest is about to move from one region to another.

Based upon the foregoing, the advantages of the present invention are readily apparent. In particular, the apparatus 10 provides for greater than a 120° field of regard. In other words, super-hemispherical scanner coverage can be obtained by implementing use of a Risley prism combination along with a rotatable azimuth mirror assembly. Such a configuration is advantageous inasmuch as the prisms and elevational mirror are coaxial with one another and as such the need for slip rings to convey positional information of each rotatable component is eliminated. This simplifies optical alignment and reduces the amount of error introduced into the detection of an observable object. Such a configuration is also advantageous in that low cost optical and electrical components may be used to enhance overall system functionality and compatibility and provide coverage in the nadir area.

Based upon the foregoing disclosure, it should now be apparent that the invention described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

The invention claimed is:

1. A scanner apparatus having super-hemispherical coverage, comprising:
   a receiver;
   a pair of counter-rotating prisms;
   a rotating mirror aligned with said pair of counter-rotating prisms, said prisms and said mirror configured to rotate about a common axis in coordination with each other, wherein said rotating mirror and said pair of counter-rotating prisms guide an observed optical signal to said receiver in a field of regard greater than that which is achievable through the use of only said pair of counter-rotating prisms.

2. The apparatus according to claim 1, further comprising:
a controller connected to said pair of counter-rotating prisms and said rotating mirror so as to monitor at least a selected position in said field of regard.

3. The apparatus according to claim 2, further comprising:
a motor/encoder assembly associated with each said prism and said rotating mirror, each said motor/encoder assembly connected to said controller, wherein said controller guides said observed optical signal by commanding each said motor/encoder assembly to rotate each associated component.

4. The apparatus according to claim 1, wherein said rotating mirror and said pair of counter-rotating prisms provide a field of regard of about 230°.

5. The apparatus according to claim 3, wherein a portion of said observed optical signal is directly received by said pair of counter-rotating prisms and wherein another portion of said observed optical signal is directly received by said pair of counter-rotating prisms and said rotating mirror.

6. The apparatus according to claim 5, wherein said controller commands said first motor/encoder assembly associated with one of said prisms to rotate in a first direction at a first predetermined rate, said second motor/encoder assembly associated with said other prism to rotate in a second direction opposite said first direction at a second predetermined rate, and said third motor/encoder assembly associated with said mirror to rotate in one of said first and second directions at a rate substantially equivalent to a difference between said first and second predetermined rates.

7. The apparatus according to claim 3, further comprising:
a laser connected to said controller, said laser generating an emitted optical signal directed by said rotating mirror and said counter-rotating prisms into said field of regard.

8. The apparatus according to claim 7, wherein said observed optical signal is a reflection of said emitted optical signal.

9. The apparatus according to claim 7, further comprising:
a column interposed between said receiver and said pair of counter-rotating prisms, said emitted optical signal and said observed optical signal passing through said column.

10. The apparatus according to claim 9, wherein said column comprises:
a transmit mirror suspended within said column, said transmit mirror reflecting said emitted optical signal and allowing said observed optical signal to pass through said column to said receiver; and
an end mirror carried by said column, said end mirror collecting said observed optical signal.

11. The apparatus according to claim 10, further comprising:
a focusing mirror carried by said column, said end mirror having an aperture therethrough, said focusing mirror reflecting said observed optical signal from said end mirror through said aperture.

12. The apparatus according to claim 11, further comprising:
a beam divergence switch coupled to said laser and connected to said controller, wherein if said receiver detects an object of interest in said observed optical signal, said controller focuses said emitted optical signal applied to said object of interest.

13. The apparatus according to claim 11, wherein said controller, upon detection of the object of interest in said observed optical signal commands all of said motor/encoder assemblies to maintain constant contact of said emitted optical signal on the object of interest.

14. A scanner apparatus, comprising,
a first prism rotatable in a first direction;
a second prism aligned with said first prism and rotatable in a second direction;
a mirror aligned with said first and second prisms and rotatable in one of said first and second directions, wherein said first prism, said second prism and said mirror rotate about a common axis in coordination with each other; and
a controller coupled to said prisms and said mirror to control positioning thereof with respect to one another and at least observe an object of interest.

15. The apparatus according to claim 14, wherein said mirror is angularly oriented with respect to said prisms.

16. The apparatus according to claim 14, further comprising:
a receiver connected to said controller and positioned to receive an optical signal of the object of interest, said controller selectively rotating said prisms and said mirror to continually observe the object of interest.

17. The apparatus according to claim 16, further comprising:
a laser connected to said controller, said laser generating an emitted optical signal, and said controller selectively rotating said prisms and said mirror at the object of interest so as to generate an observed optical signal.

18. The apparatus according to claim 17, wherein said controller rotates said first prism at a first rate and said second prism at a second rate, and wherein said controller rotates said mirror at a rate of difference between said first rate and said second rate such that said emitted optical signal observes a field of regard greater than that which is achievable through the use of only said prisms.

19. The apparatus according to claim 18, wherein said emitted optical signal is guided through only said prisms to directly scan a portion of said field of regard and through said prisms and reflected by said mirror to reflectively scan another portion of said field of regard.

20. A method for scanning a field of regard, comprising:
providing a first prism, a second prism, and a mirror that rotate about a common axis in coordination with each other;
rotating said first prism in a first direction;
rotating said second prism in a second direction;
rotating said mirror in one of said first and second directions; and
aligning said prisms and said mirror during said rotating steps to observe an object of interest in a field of regard.

21. The method according to claim 20, further comprising:
selectively rotating just said first and second prisms to directly observe said object of interest in a portion of said field of regard; and
selectively rotating said first and second prisms and said mirror to reflectively observe said object of interest in another portion of said field of regard.

22. The method according to claim 21, further comprising:
observing said object of interest overlapping in both said portion and said another portion of said field of regard.

23. The method according to claim 22, further comprising:

determining if said object of interest is observed in a direct scan region, a reflective scan region or an overlapped scan region;

determining which other region said object of interest is closer to when said object of interest is in said overlapped scan region; and repeating said corresponding selectively rotating step depending upon if said object of interest is closer to said direct scan region or said reflective scan region.

24. The method according to claim 23, further comprising:

changing to the other selectively rotating step if said object of interest moves from one of said direct scan region and said reflective scan region to the other.

25. The apparatus according to claim 14, wherein said rotating mirror and said pair of counter-rotating prisms provide a field of regard of about 230°.

26. The method according to claim 20, further comprising:

rotating said mirror and said prisms in said field of regard of about 230°.

* * * * *